United States Patent
Chen et al.

(10) Patent No.: US 10,511,529 B2
(45) Date of Patent: Dec. 17, 2019

(54) PACKET PROCESSING METHOD FOR VIRTUAL SWITCH

(71) Applicant: CASWELL, INC., New Taipei (TW)

(72) Inventors: Yen-Hsiang Chen, New Taipei (TW); Jen-Chieh Cheng, New Taipei (TW); I-Cheng Shen, New Taipei (TW); Yuh-Shyan Chen, New Taipei (TW); Tai-Xiang Liao, New Taipei (TW)

(73) Assignee: CASWELL, INC., New Taipei (TW)

( * ) Notice: Subject to any disclaimer, the term of this patent is extended or adjusted under 35 U.S.C. 154(b) by 370 days.

(21) Appl. No.: 15/418,082

(22) Filed: Jan. 27, 2017

(65) Prior Publication Data

US 2017/0244636 A1 Aug. 24, 2017

(30) Foreign Application Priority Data

Feb. 24, 2016 (TW) .............................. 105105499 A (51) Int. Cl.
*H04L 12/741* (2013.01)
*H04L 29/06* (2006.01)
*H04L 12/931* (2013.01)
*H04L 12/721* (2013.01)
*H04L 12/743* (2013.01)
*H04L 12/751* (2013.01)

(52) U.S. Cl.
CPC ............ *H04L 45/745* (2013.01); *H04L 45/38* (2013.01); *H04L 45/54* (2013.01); *H04L 45/7453* (2013.01); *H04L 49/70* (2013.01); *H04L 69/22* (2013.01); *H04L 45/02* (2013.01)

(58) Field of Classification Search
USPC ....................................................... 370/392
See application file for complete search history.

(56) References Cited

U.S. PATENT DOCUMENTS

| 7,411,957 | B2 * | 8/2008 | Stacy ...................... H04L 47/32 370/392 |
| 9,419,878 | B2 | 8/2016 | Hsiao et al. |
| 2011/0122874 | A1 * | 5/2011 | Pacella .................... H04L 45/00 370/392 |
| 2013/0329584 | A1 * | 12/2013 | Ghose ................... H04L 45/586 370/252 |
| 2013/0347110 | A1 * | 12/2013 | Dalal ...................... H04L 41/12 726/23 |
| 2015/0117455 | A1 * | 4/2015 | Umesh .................... H04L 45/38 370/392 |
| 2015/0304194 | A1 * | 10/2015 | Ghose ................... H04L 45/586 370/392 |

* cited by examiner

*Primary Examiner* — Alpus Hsu
*Assistant Examiner* — Hooman Houshmand
(74) *Attorney, Agent, or Firm* — Muncy, Geissler, Olds & Lowe, P.C.

(57) ABSTRACT

A packet processing method for a virtual switch is carried out in a virtual switch under the SDN architecture. The method presets a signature pre-computation table including plural destination addresses and signatures corresponding to the destination addresses. With the installation of the signature pre-computation table, the destination addresses fall into packets of the signature pre-computation table without requiring computing the signature of the packet. The method simply obtains the corresponding signature according to the destination address of the packet destination address, and thus saves the time required for processing a packet and improves the throughput of the virtual switch.

9 Claims, 10 Drawing Sheets

PACKET PROCESSING METHOD FOR VIRTUAL SWITCH

The present invention relates to a packet processing method for a virtual switch, in particular to the package processing method carried out in software defined network (SDN) architecture and capable of saving the time required for processing a packet and improving the throughput of the virtual switch.

BACKGROUND OF INVENTION

1. Description of the Related Art

In recent years, the Software Defined Network (SDN) and Network Function Virtualization (NFV) advance rapidly, packets of a virtual switch are processed more flexibly with a lower cost. For example, the packet processing method such as Intel's data plane development kit vSwitch (DPDK vSwitch) has a high throughput. However, if the packet size is small, such packet processing method still has a low throughput issue.

In view of the drawback of the conventional packet processing method usually having a low throughput, the inventor of the present invention conducted research and experiment and developed a method capable of saving the time of processing a packet and improving the throughput of the virtual switch.

2. Summary of the Invention

In view of the aforementioned drawbacks of the prior art, the inventor of the present invention based on years of experience in the related industry to conduct extensive research and experiment, and finally developed a packet processing method for a virtual switch in accordance with the present invention to overcome the drawbacks of the prior art.

Therefore, it is a primary objective of the present invention to overcome the drawbacks of the prior art and provide a packet processing method for a virtual switch, and the method is executed for a virtual switch under the SDN architecture and capable of making use of the installation of a signature pre-computation table to set the destination address falling within the packets in the signature pre-computation table without the need of computing the signature of the packet, and obtain a corresponding signature according to the destination address of the packet, so as to reduce the required time of processing a packet effectively.

To achieve the aforementioned and other objectives, the present invention discloses a packet processing method for a virtual switch, the method is carried out in a virtual switch under the SDN architecture, and the method has a flow table including a plurality of flow entries, and each flow entry is corresponding to an action. The method presets a signature pre-computation table, wherein the signature pre-computation table includes a plurality of destination addresses and a plurality of signatures corresponding to the destination addresses respectively, and the signatures of the signature pre-computation table are computed by a signature function in advance and stored in the signature pre-computation table; and the method comprising the steps of: Step (S1): inputting a packet, and then carrying out Step (S2); Step (S2): resolving a destination address of the packet, and then carrying out Step (S3); Step (S3): comparing the destination address with the signature pre-computation table, and determining whether the destination address falls in the signature pre-computation table, if yes, then carrying out Step (S4); or else carrying out Step (S5); Step (S4): obtaining a signature according to the destination address of the packet, and then carrying out Step (S7); Step (S5): resolving the structure of the packet, and then carrying out Step (S6); Step (S6): computing the signature of the packet according to the structure of the packet, and then carrying out Step (S7); Step (S7): comparing the signature of the packet with a plurality of flow entries of the flow table, and determining whether the signature falls within the flow entries, if yes, carrying out Step (S8); if no, carrying out Step (S9); Step (S8): performing an action corresponding to the flow entry where the signature is situated, and then carrying out Step (S10); Step (S9): discarding the packet; and Step (S10): outputting the packet.

Wherein, the packet processing method for a virtual switch further comprises a program of dynamically updating the signature pre-computation table taken place between the Steps (S1) and (S2), and the program of dynamically updating the signature pre-computation table presets a predetermined quantity as a threshold, and the threshold has a unit, and the program of dynamically updating the signature pre-computation table has a cumulative counter for computing a cumulative quantity of the threshold unit, and the program of dynamically updating the signature pre-computation table comprises the steps of: Step (S12): updating the cumulative quantity by the cumulative counter, and determining whether the cumulative quantity has reached the threshold, if yes, carrying out Step (S13); if no, carrying out Step (S2); Step (S13): obtaining a destination address table, and then carrying out Step (S14); Step (S14): retrieving a key value structure with a destination address (ip_dst) from the packet structure of the packet, filling a destination address (Dst_ip) of the destination address table into the destination address (ip_dst) of the key value structure required for computing the destination address table, and then carrying out Step (S15); Step (S15): computing the signatures of all packets of the destination address table, and then carrying out Step (S16); Step (S16): storing the signatures and destination addresses of all packets of the destination address table into the signature pre-computation table, and then carrying out Step (S17); and Step (S17): resetting the cumulative quantity of the packet to zero, and then carrying out Step (S2).

Wherein, the threshold is in a unit of {packet}, {system operation time in seconds} or {system idle time in seconds}.

Wherein, the threshold is in the unit of {packet}, then the cumulative quantity counted by the cumulative counter is a packet cumulative quantity, and the cumulative counter updating the cumulative quantity refers to the cumulative counter incrementing the packet cumulative quantity by 1.

Wherein, when the threshold is in the unit of {system operation time in seconds}, the cumulative quantity counted by the cumulative counter is a cumulative system operation time in seconds, and the cumulative counter updating the cumulative quantity refers to the cumulative counter counting the cumulative quantity of the system operation time in seconds which is equal to a cumulative system operation time in seconds.

Wherein, when the threshold is in the unit of {system idle time in seconds}, the cumulative quantity counted by the cumulative counter is a cumulative system idle time in seconds, and the cumulative counter updating the cumulative quantity refers to the cumulative counter counting the cumulative quantity of the system idle time in seconds which is equal to a cumulative system idle time in seconds.

Wherein, the destination address table in Step (S13) is obtained by a dynamic program, and the dynamic program comprises the steps of: Step (S22): setting the quantity of addresses of the destination address table, and then carrying out Step (S23); Step (S23): selecting flow entries including the destination address from the flow table, and then carrying out Step (S24); Step (S24): sorting the flow entries in a descending order according to the number of using the packet, and then carrying out Step (S25); Step (S25): capturing the destination addresses of the flow entries to form the destination address table, and the destination address of any flow entry exceeding the quantity of addresses will not be captured, and then carrying out Step (S26); and Step (S26): providing the destination address table to Step (S13) as the destination address table of the Step (S13), and then returning to Step (S23).

The packet processing method for a virtual switch further comprises further a program of fixedly setting a signature pre-computation table taken place between the Steps (S1) and (S2), and the program of fixedly setting a signature pre-computation comprising the steps of: Step (S43): obtaining a destination address table, and then carrying out Step (S44); Step (S44): retrieving a key value structure from the packet structure of the packet, and the key value structure having a destination address (ip_dst), and filling a destination address (Dst_ip) of the destination address table into a destination address (ip_dst) to compute the key value structure required by the signature, and then carrying out Step (S45); Step (S45): computing the signatures of all packets of the destination address table, and then carrying out Step (S46); and Step (S46): storing the signatures and destination addresses of all packets of the destination address table into the signature pre-computation table, and then carrying out Step (S2).

Wherein, the destination address table in the Step (S43) is obtained by a fixed program, and the fixed program comprises the steps of: Step (S32): setting the quantity of addresses of the destination address table, and then carrying out Step (S33); Step (S33): setting a plurality of destination addresses required to be optimized, and then carrying out Step (S34); Step (S34): forming the destination address table by the set plurality of destination addresses required to be optimized, and then carrying out Step (S35); and Step (S35): providing the destination address table to the Step (S43) as the destination address table of the Step (S43).

Wherein, the set plurality of destination addresses required to be optimized of the Step (S33) refers to the plurality of destination addresses statistically having a frequency of inputting packets greater than a predetermined frequency value.

DESCRIPTION OF THE PREFERRED EMBODIMENTS

The above and other objects, features and advantages of this disclosure will become apparent from the following detailed description taken with the accompanying drawings.

Figure 1:
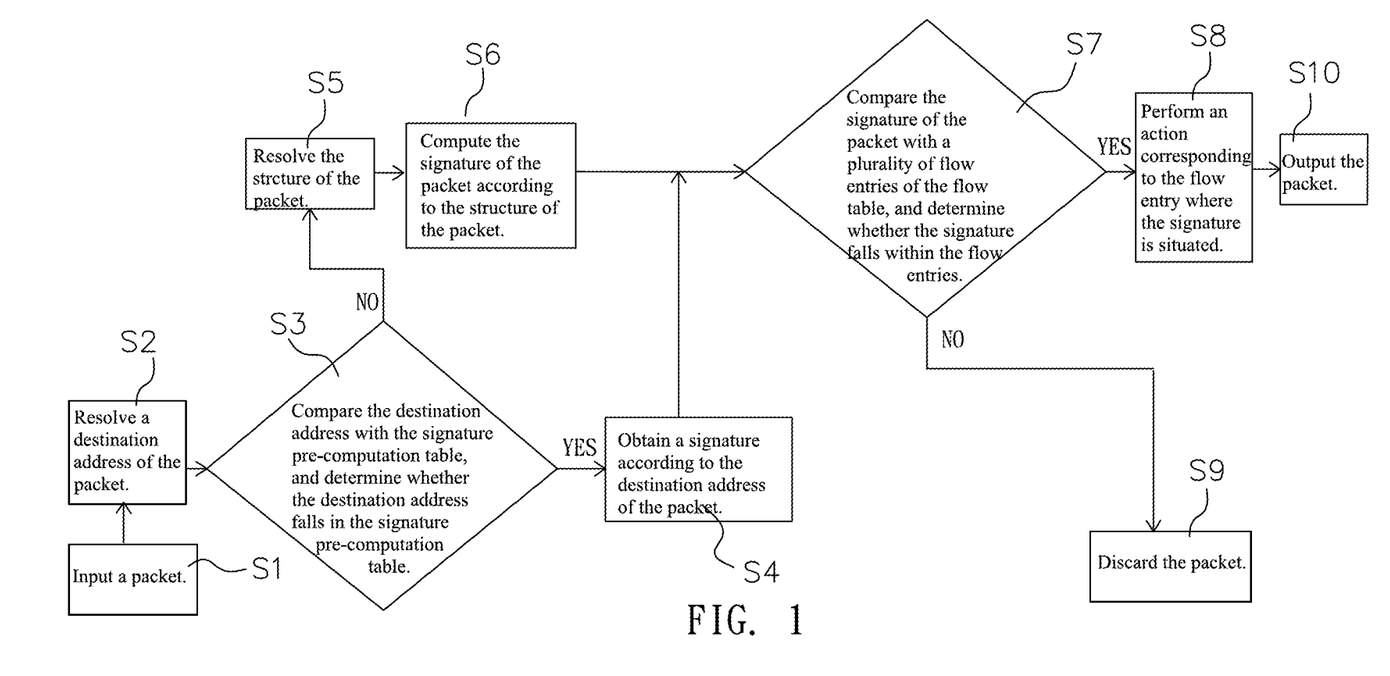
FIG. 1 is a flow chart of a packet processing method of a virtual switch in accordance with the present invention.

With reference to FIG. 1 for a packet processing method of a virtual switch in accordance with the present invention, the method is carried out in a virtual switch under a software defined network (SDN) architecture; and the method has a flow table, and the flow table includes a plurality of flow entries, and each flow entry has a corresponding action, and the method presets a signature pre-computation table, and the signature pre-computation table includes a plurality of destination addresses (Dst_ip) and a plurality of signatures corresponding to the destination addresses respectively, and the signatures of the signature pre-computation table are computed by a signature function in advance and stored in the signature pre-computation table; and the method comprises the steps of:

Step (S1): inputting a packet, and then carrying out Step (S2); Step (S2): resolving a destination address of the packet, and then carrying out Step (S3); Step (S3): comparing the destination address with the signature pre-calculation table, and determining whether the destination address falls in the signature pre-calculation table, if yes, then carrying out Step (S4); or else carrying out Step (S5); Step (S4): obtaining a signature according to the destination address of the packet, and then carrying out Step (S7); Step (S5): resolving the structure of the packet, and then carrying out Step (S6); Step (S6): calculating the signature of the packet according to the structure of the packet, and then carrying out Step (S7); Step (S7): comparing the signature of the packet with a plurality of flow entries of the flow table, and determining whether the signature falls within the flow entries, if yes, carrying out Step (S8); if no, carrying out Step (S9); Step (S8): performing an action corresponding to the flow entry where the signature is situated, and then carrying out Step (S10); Step (S9): discarding the packet; and Step (S10): outputting the packet.

The packet processing method for a virtual switch is capable of making use of the installation of a signature pre-calculation table to set the destination address falling within the packets in the signature pre-calculation table without the need of calculating the signature of the packet, and obtain a corresponding signature according to the destination address of the packet, so as to reduce the required time of processing a packet effectively and improve the throughput of the virtual switch.

In the Step (S2), the destination address of the packet is resolved, and it is necessary to resolve the destination address only, because the next Step (S3) just needs to determine whether or not the destination address falls in the signature pre-computation table, and the Step (S2) does not need to resolve other headers of the packet, so as to save the time of resolving other headers of the packet.

In the Step (S3), the destination address is compared with the signature pre-computation table to determine whether the destination address falls in the signature pre-computation table; if yes, then the Step (S4) will be carried out; if no, then the Step (S5) will be carried out. For example, the destination address is 168470720, and if a destination address in the signature pre-computation table is 168470720 and its corresponding signature is 3383198390, then this step will determine whether the destination address falls in the signature pre-computation table, and the Step (S4) will be carried out. When the Step (S4) of this example is carried out, the corresponding signature: 3383198390 will be carried out.

In the Step (S5), the structure of the packet is resolved, and the structure of the packet includes columns such as in_port, ether_dst, vlan_id, vlan_prio, tran_src_port, etc, and this step resolves headers of the packet and sets their values into the columns corresponding to a key value structure (Ket Struct) required for computing the signature.

In the Step (S6), the signature of the packet is computed according to the structure of the packet, and a hash function is used to compute the signature. In the Step (S5) and (S6), a large amount of computing resources and computing time is consumed. According to the computation made by the inventor of the present invention, the Step (S6) will take 46% of the total computing time if the signature pre-computation table is not installed, and this method keeps the destination address in the packet of the signature pre-computation table without requiring the computation of the signature of the packet, and thus saving the time required for processing a packet and improves approximately 20% of the throughput of the virtual switch.

Figure 2:
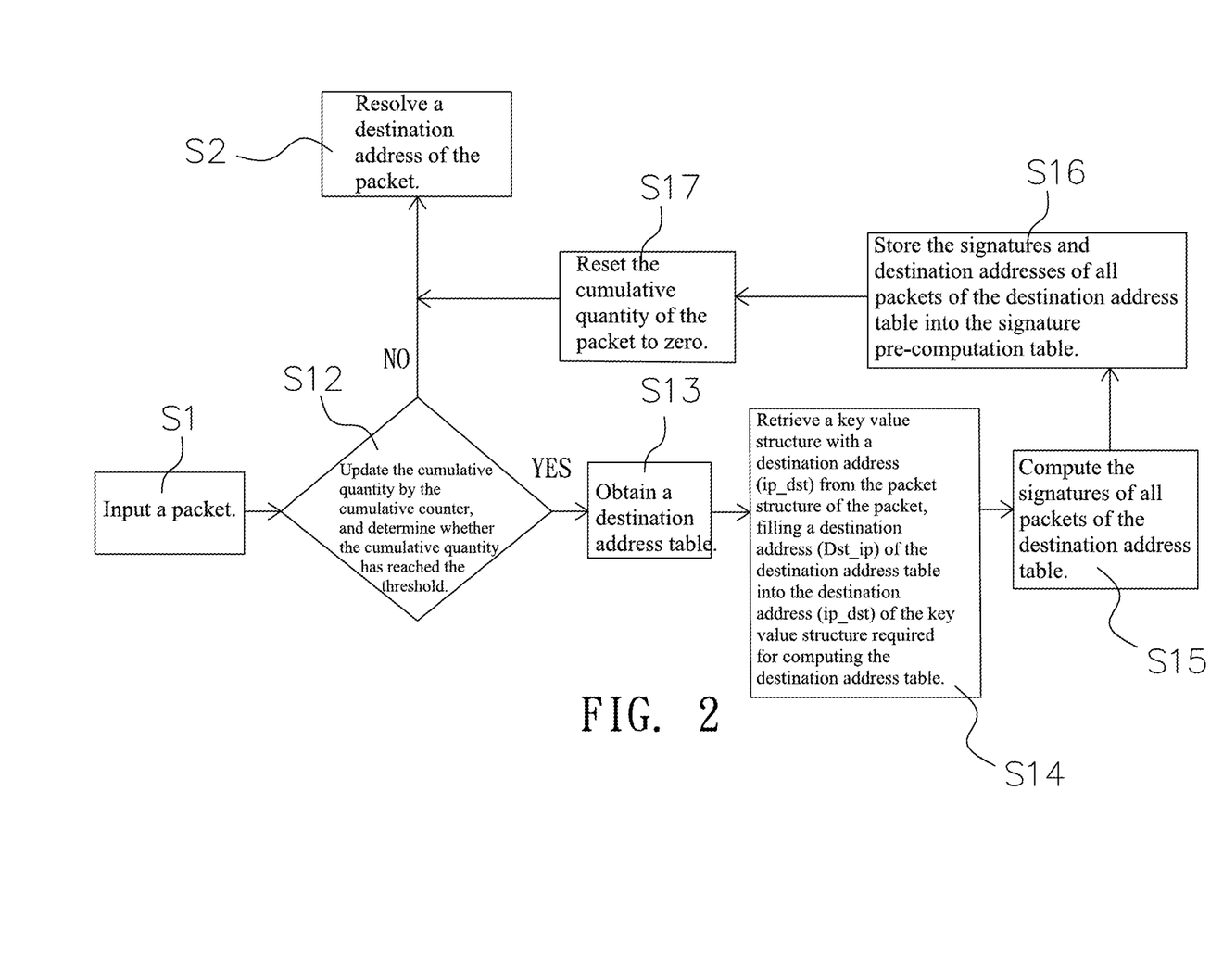
FIG. 2 is a flow chart of a dynamic program of updating a signature pre-computation table in accordance with the present invention.

With reference to FIG. 2 for a flow chart of a dynamic program of updating a signature pre-computation table in accordance with the present invention, a program of dynamically updating a signature pre-computation table is carried out between the Steps (S1) and (S2), and the program of dynamically updating the signature pre-computation table presets a quantity as a threshold, and the threshold has a unit, and the program of dynamically updating the signature pre-computation table has a cumulative counter for computing a cumulative quantity of the threshold unit, and the program of dynamically updating the signature pre-computation table comprises the steps of: Step (S12): updating the cumulative quantity by the cumulative counter, and determining whether the cumulative quantity has reached the threshold, if yes, carrying out Step (S13); if no, carrying out Step (S2); Step (S13): obtaining a destination address table, and then carrying out Step (S14); Step (S14): retrieving a key value structure with a destination address (ip_dst) from the packet structure of the packet, filling a destination address (Dst_ip) of the destination address table into the destination address (ip_dst) of the key value structure required for calculating the destination address table, and then carrying out Step (S15); Step (S15): calculating the signatures of all packets of the destination address table, and then carrying out Step (S16); Step (S16): storing the signatures and destination addresses of all packets of the destination address table into the signature pre-calculation table, and then carrying out Step (S17); and Step (S17): resetting the cumulative quantity of the packet to zero, and then carrying out Step (S2).

In the dynamic update of the signature pre-computation table in accordance with the first preferred embodiment of the present invention, the signature pre-computation table is updated continuously, so that the past data can be maintained at a fresh status, and can keep up with the synchronization of the rules in the flow table as much as possible.

Wherein, the threshold is in a unit of {packet}, {system operation time in seconds} or {system idle time in seconds}, etc. In the present invention, the unit of the threshold is not expressed as above, and the unit of the threshold may be set by a user according to the requirement of the user's operation.

The cumulative counter computes the cumulative quantity related to the threshold unit, and it refers to the following. When the threshold is in the unit of {packet}, then the cumulative quantity counted by the cumulative counter is a packet cumulative quantity, and the cumulative counter updating the cumulative quantity of the Step (S12) refers to the cumulative counter incrementing the packet cumulative quantity by 1. For example, if the threshold is 1000 packets, and the quantity of cumulative quantity packets has reached 1000, then the Steps (S13)~(S16) will run the program of updating the signature pre-computation table, or else the program of updating the signature pre-computation table will not run, and the Step (S2) will be carried. In the Step (S12), the cumulative quantity of packets is incremented by 1 when the cumulative counter updates the cumulative quantity.

The cumulative counter computes the cumulative quantity related to the threshold unit, and it refers to the following. When the threshold is in the unit of {system operation time in seconds}, the cumulative quantity counted by the cumulative counter is a cumulative system operation time in seconds, and the cumulative counter updating the cumulative quantity of the Step (S12) refers to the cumulative counter counting the cumulative quantity of the system operation time in seconds which is equal to a cumulative system operation time in seconds. For example, if the threshold is set to 3600 {system operation time in seconds}, and the cumulative system operation time in seconds has reached 3600 seconds, then the program of updating the signature pre-computation table as described in the Steps (S13)~(S16) will be run, and if the cumulative system operation time in seconds has not reached 3600 seconds, then the program of updating the signature pre-computation table will not be run, but the Step (S2) will be carried out. In the Step (S12), when the cumulative counter updates the cumulative quantity, the cumulative quantity of packets is computed to be equal to the cumulative system operation time in seconds.

The cumulative counter computes the cumulative quantity related to the threshold unit, and it refers to the following. When the threshold is in the unit of {system idle time in seconds}, the cumulative quantity counted by the cumulative counter is a cumulative system idle time in seconds, and the cumulative counter updating the cumulative quantity as described in the Step (S12) refers to the cumulative counter counting the cumulative quantity of the system idle time in seconds which is equal to a cumulative system idle time in seconds. In the Step (S12), the cumulative counter updates the cumulative quantity, and it refers that the cumulative counter computes the cumulative quantity of the system idle time in seconds to be equal to a cumulative system idle time in seconds. For example, if the threshold is set to 3600 {system idle time in seconds}, and the cumulative system idle time in seconds has reached 3600 seconds, then the program of updating the signature pre-computation table as described in the Step (S13)~(S16) will be run, and if the cumulative system idle time in seconds has not reached 3600 seconds, then the program of updating the signature pre-computation table will not be run, and the Step (S2) will be carried out. In the Step (S12), when the cumulative counter updates the cumulative quantity, the cumulative quantity of packets is computed to be the cumulative system idle time in seconds.

The smaller the threshold, the more frequency the updates. However, a too-frequent update will lower the performance of the virtual switch. On the other hand, a too-large threshold will cause a very slow update, and fail to synchronize the rules of the flow table. In general, a smaller threshold may be set for a machine with a higher performance, so that the performance of the virtual switch will not be lowered even in the case of having too-frequent updates. For a machine with a low performance, a larger threshold may be set to prevent lowering the performance of the virtual switch.

Figure 3:
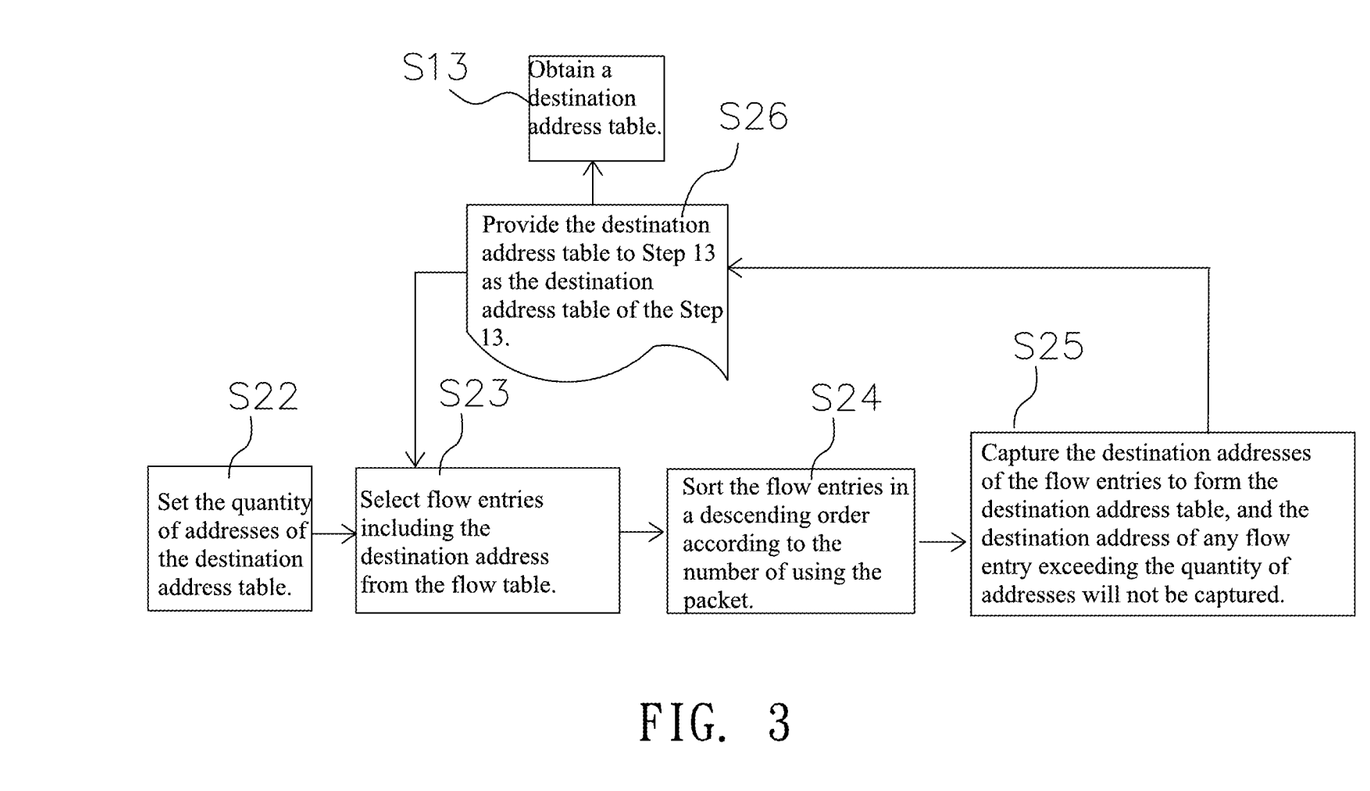
FIG. 3 is a flow chart of a dynamic program of obtaining a destination address table in accordance with a first embodiment of the present invention.

With reference to FIG. 3 for a flow chart of a dynamic program of obtaining a destination address table in accordance with the first embodiment of the present invention, a destination address table as described in the Step (S13) is obtained by a dynamic program, and the dynamic program comprises the steps of:

Step (S22): setting the quantity of addresses of the destination address table, and then carrying out Step (S23); Step (S23): selecting flow entries including the destination address from the flow table, and then carrying out Step (S24); Step (S24): sorting the flow entries in a descending order according to the number of using the packet, and then carrying out Step (S25); Step (S25): capturing the destination addresses of the flow entries to form the destination address table, and the destination address of any flow entry exceeding the quantity of addresses will not be captured, and then carrying out Step (S26); and Step (S26): providing the destination address table to Step (S13) as the destination address table of the Step (S13), and then returning to Step (S23).

In the Step (S22), the quantity of addresses of the destination address table is set, and it refers that the quantity of addresses of the destination address table cannot be unlimitedly large, and it is set to a limited number before a relatively good performance of the virtual switch can be maintained.

Figure 5:
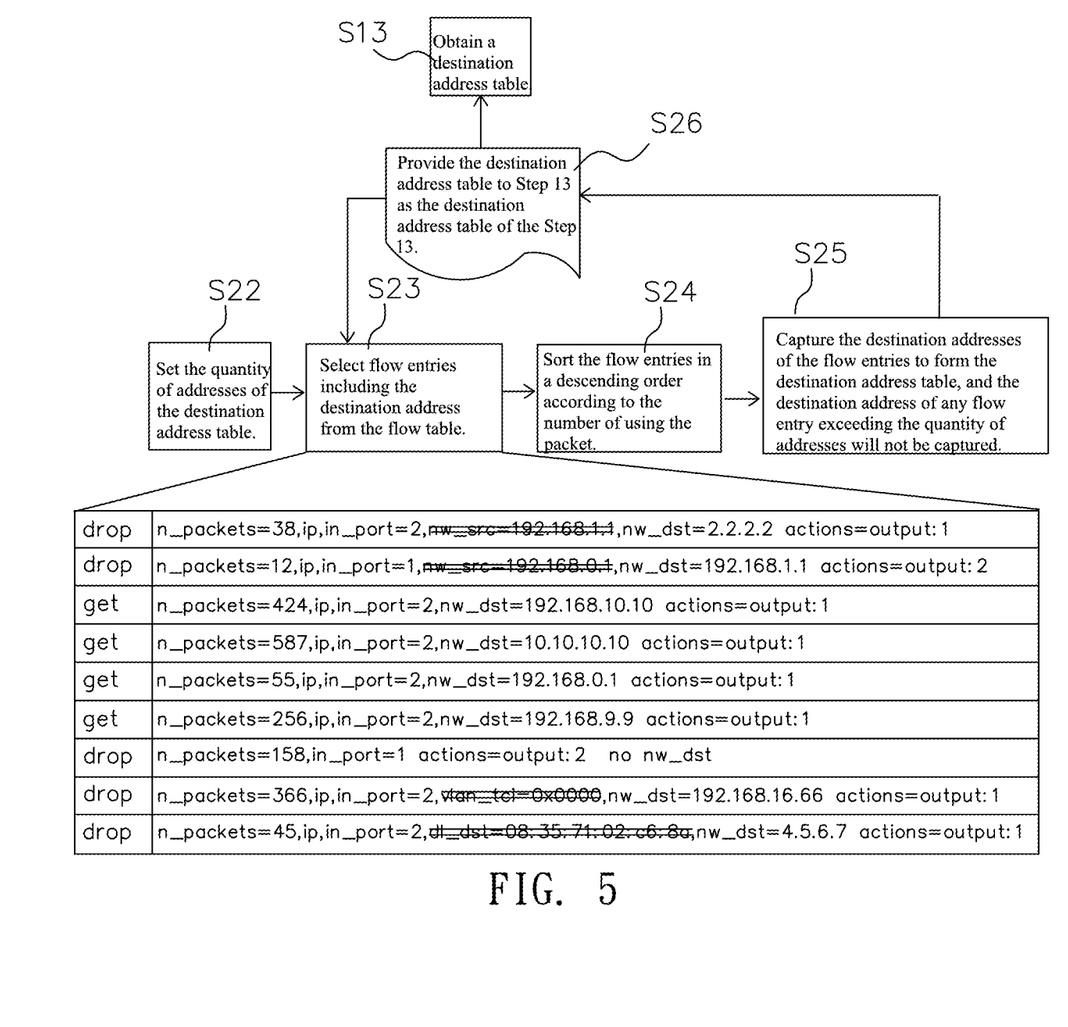
FIG. 5 is a flow chart of a dynamic program of obtaining a destination address table in accordance with the first embodiment of the present invention, wherein Step (S23) is illustrated.

In the Step (S23), flow entries contained in the destination address is selected from the flow table, and it refers that the flow entry containing the destination address is provided for improving the performance. As shown in FIG. 5, only four flow entries in "get" are reserved. In other words, the destination addresses are kept, and other flow entries are deleted.

Figure 6:
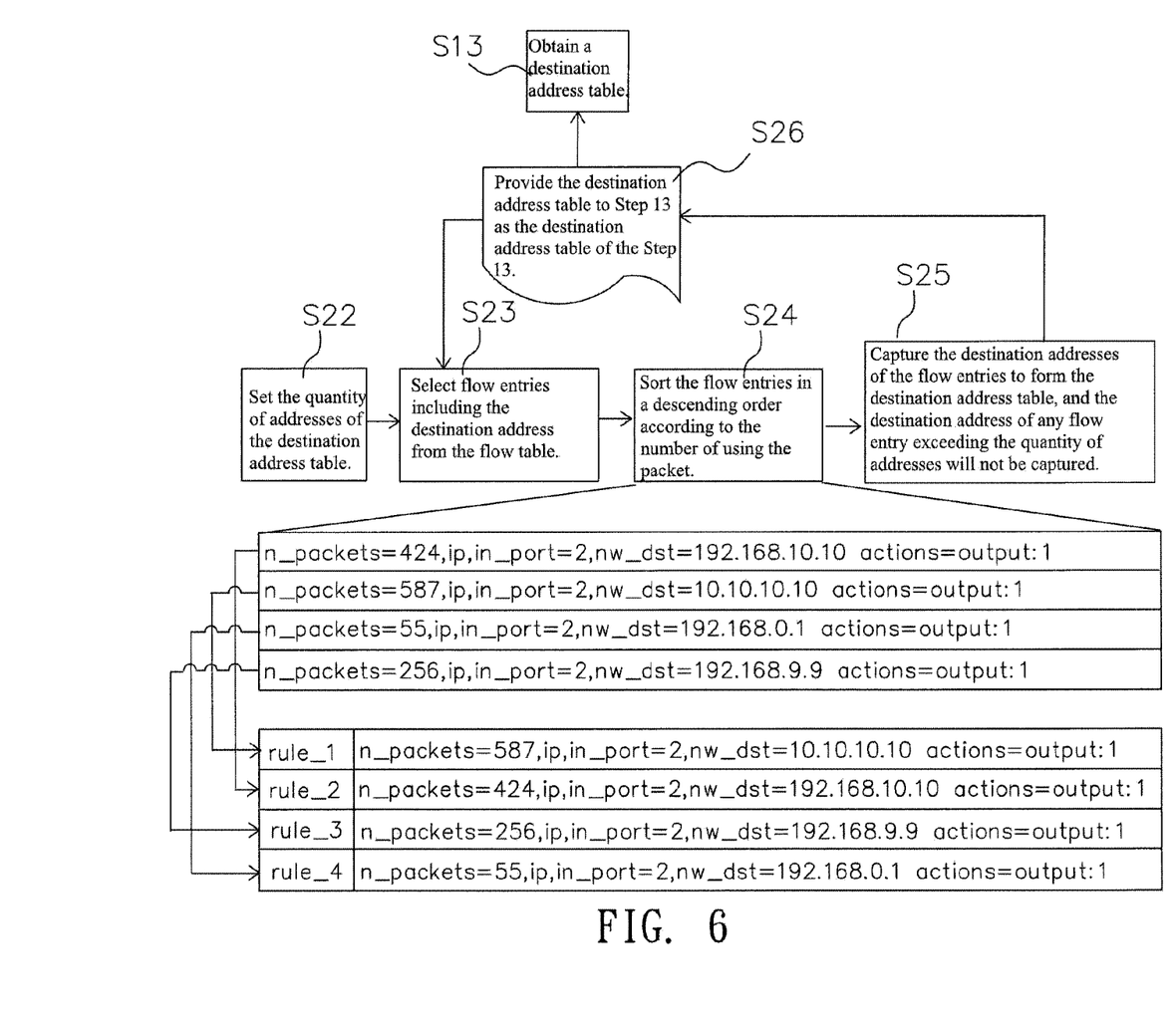
FIG. 6 is a flow chart of dynamic program of obtaining a destination address table in accordance with the first embodiment of the present invention, wherein Step (S24) is illustrated.

In the Step (S24), the flow entries are sorted in a descending order according to the number of times of using the packets, and it refers that the packet with the most usage frequency is arranged at the front, and arranged in the descending order. In FIG. 6, the packet with the most usage frequency is arranged in the front, and it shows that the hit rate of the comparison is high, so as to reduce the comparison time.

Figure 7:
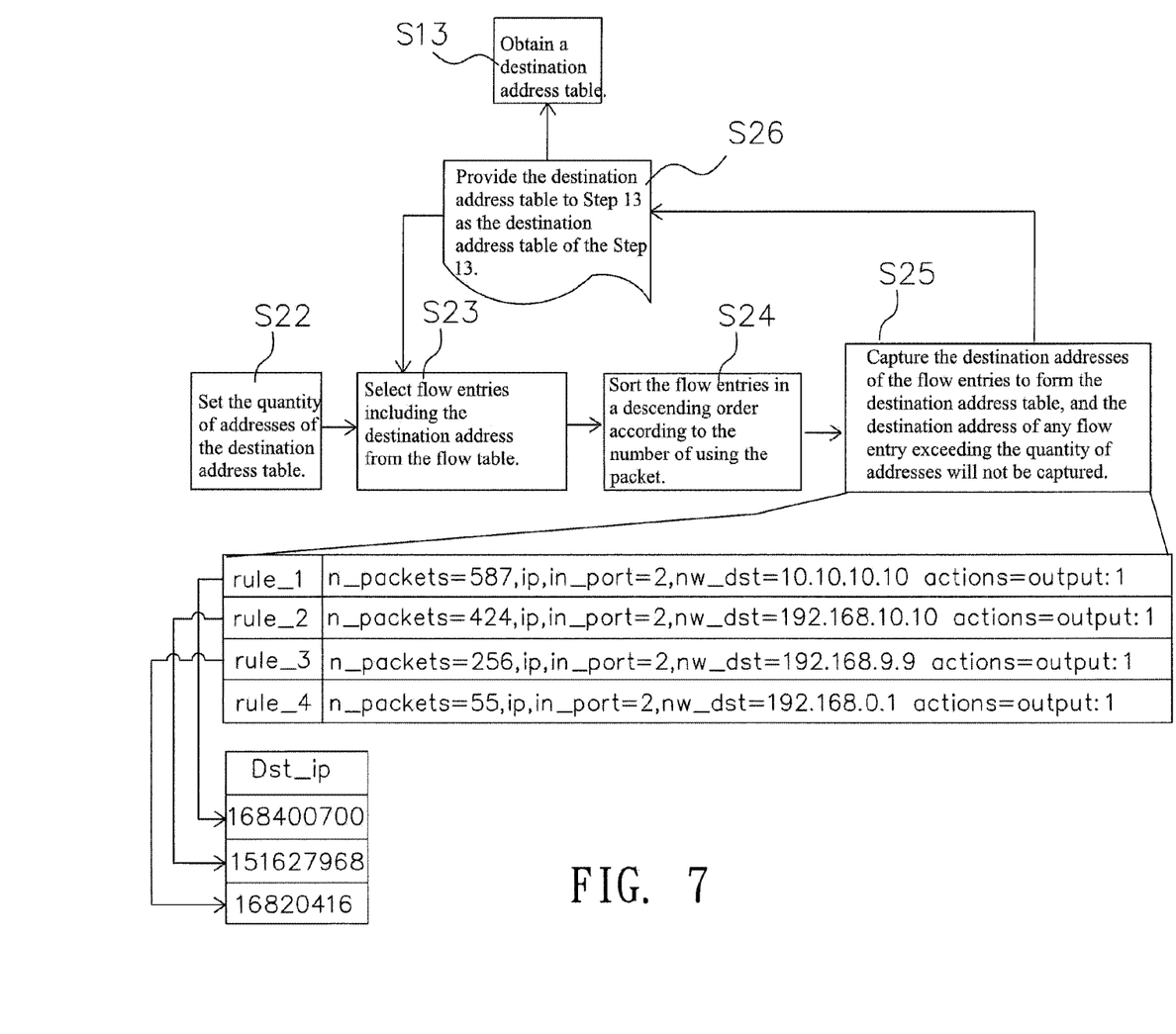
FIG. 7 is a flow chart of a dynamic program of obtaining a destination address table in accordance with the first embodiment of the present invention, wherein Step (S25) is illustrated.

In the Step (S25), the destination addresses of the flow entries are captured to form the destination address table, and the destination address of any flow entry exceeding the quantity of addresses will not be captured, and it refers that the destination address table just needs the destination addresses of the flow entries to create the destination address table. Since the quantity of addresses of the destination address table is limited, therefore the destination address of any flow entry exceeding the predetermined quantity will not be captured as shown in FIG. 7.

Figure 4:
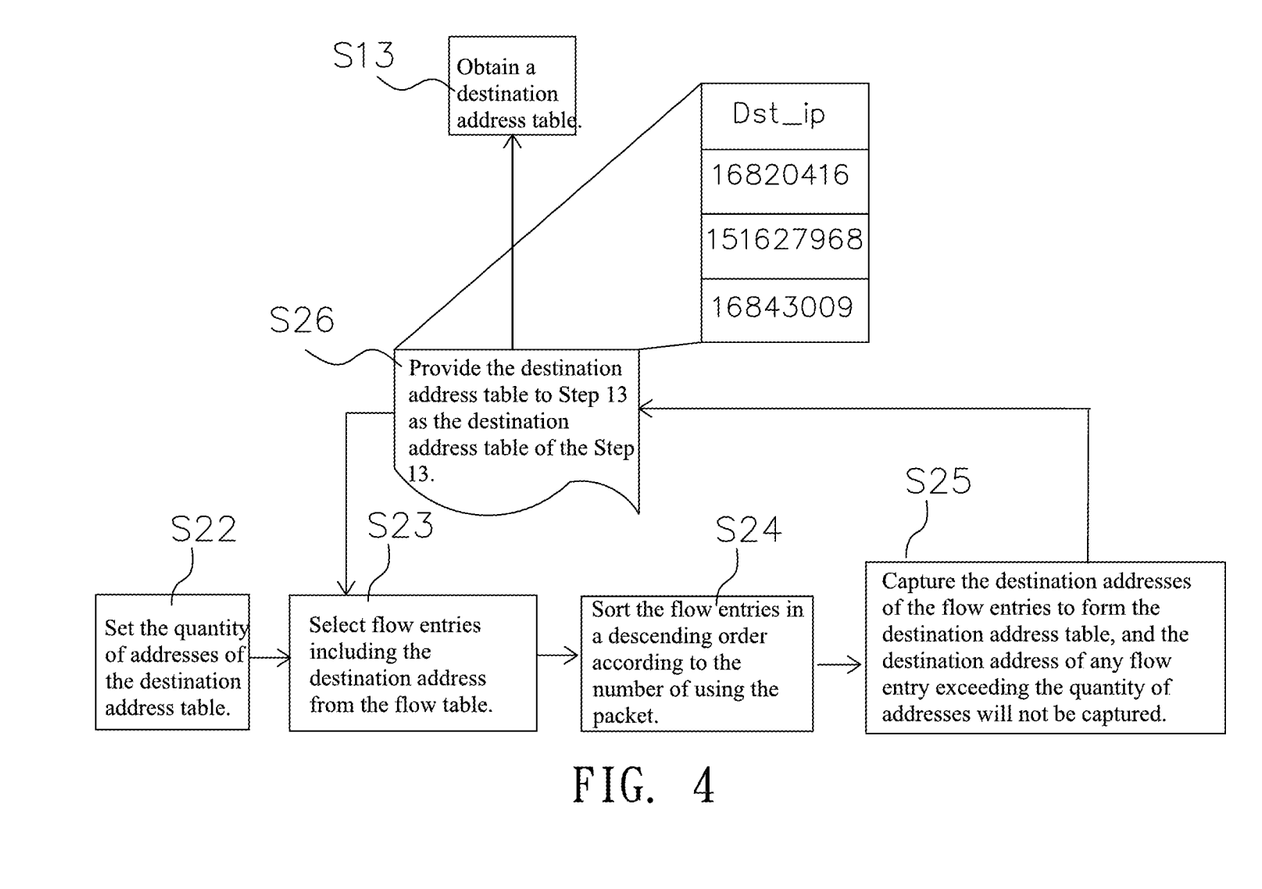
FIG. 4 is a flow chart of a dynamic program of obtaining a destination address table in accordance with the first embodiment of the present invention, wherein Step (S26) is illustrated.

In the Step (S26), the destination address table is provided to the Step (S13) and used as the destination address table of the Step (S13), and it refers that the destination address table is provided to the Step (S13) as shown in FIG. 4.

The destination address table and the flow table can be synchronized through the aforementioned steps of the dynamic program. In the dynamic update of the signature pre-computation table, appropriate rules can be selected dynamically for pre-calculation according to the current rules of the flow table. Compared with the conventional methods, the method of the present invention has high flexibility and improves the throughput of the virtual switch, but its performance is slightly lower than the method of fixedly setting the signature pre-computation table in accordance with the second preferred embodiment as described below.

Figure 8:
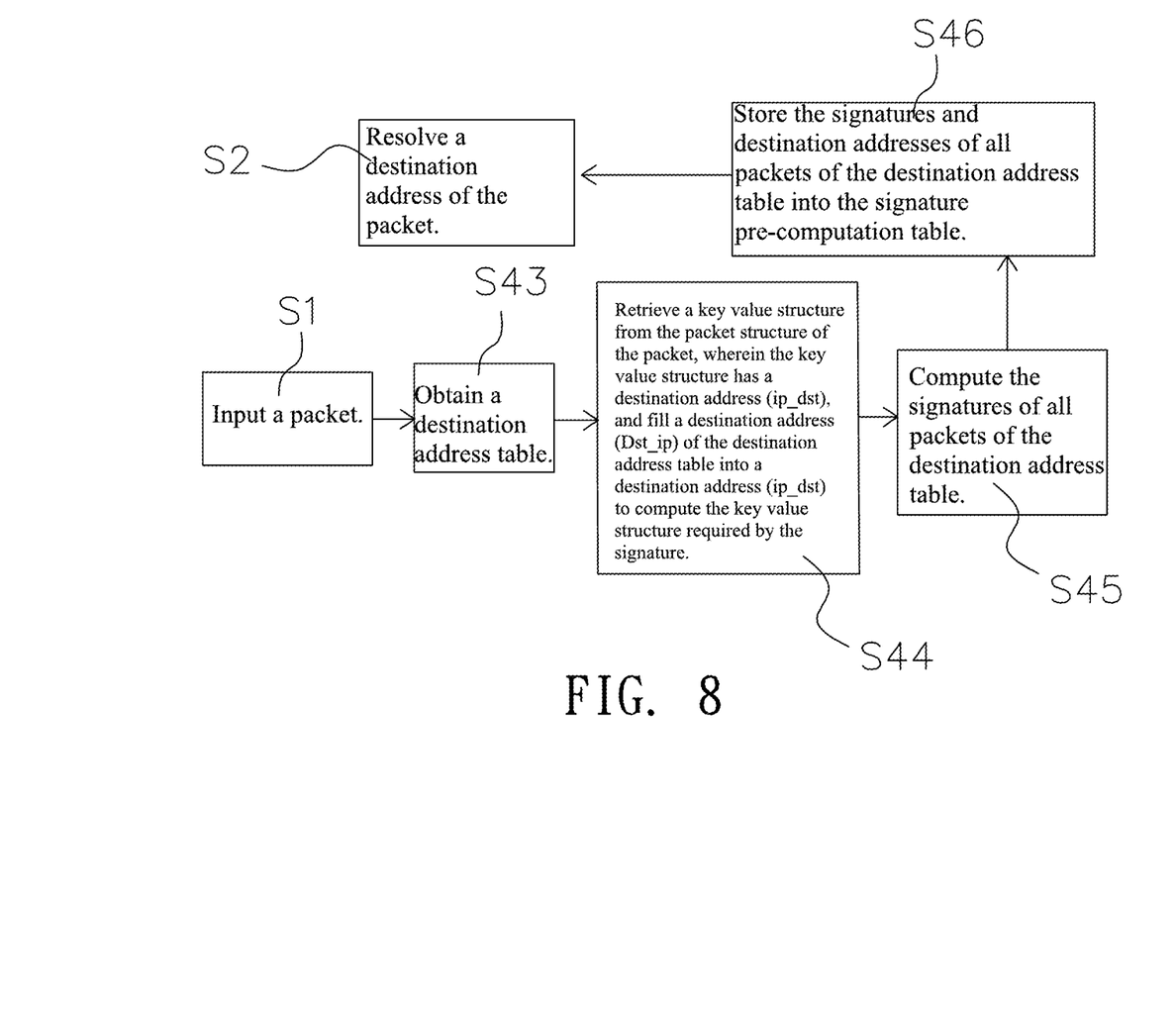
FIG. 8 is a flow chart of a fixed program of setting a signature pre-computation table in accordance with a second embodiment of the present invention.

With reference to FIG. 8 for a flow chart of a program of fixedly of setting a signature pre-computation table in accordance with the second embodiment of the present invention, the program of fixedly of setting a signature pre-computation table is carried out between the Steps (S1) and (S2), and the program of fixedly of setting a signature pre-computation table comprises the steps of: Step (S43): obtaining a destination address table, and then carrying out Step (S44); Step (S44): retrieving a key value structure from the packet structure of the packet, and the key value structure having a destination address (ip_dst), and filling a destination address (Dst_ip) of the destination address table into a destination address (ip_dst) to compute the key value structure required by the signature, and then carrying out Step (S45); Step (S45): computing the signatures of all packets of the destination address table, and then carrying out Step (S46); and Step (S46): storing the signatures and destination addresses of all packets of the destination address table into the signature pre-computation table, and then carrying out Step (S2).

Figure 9:
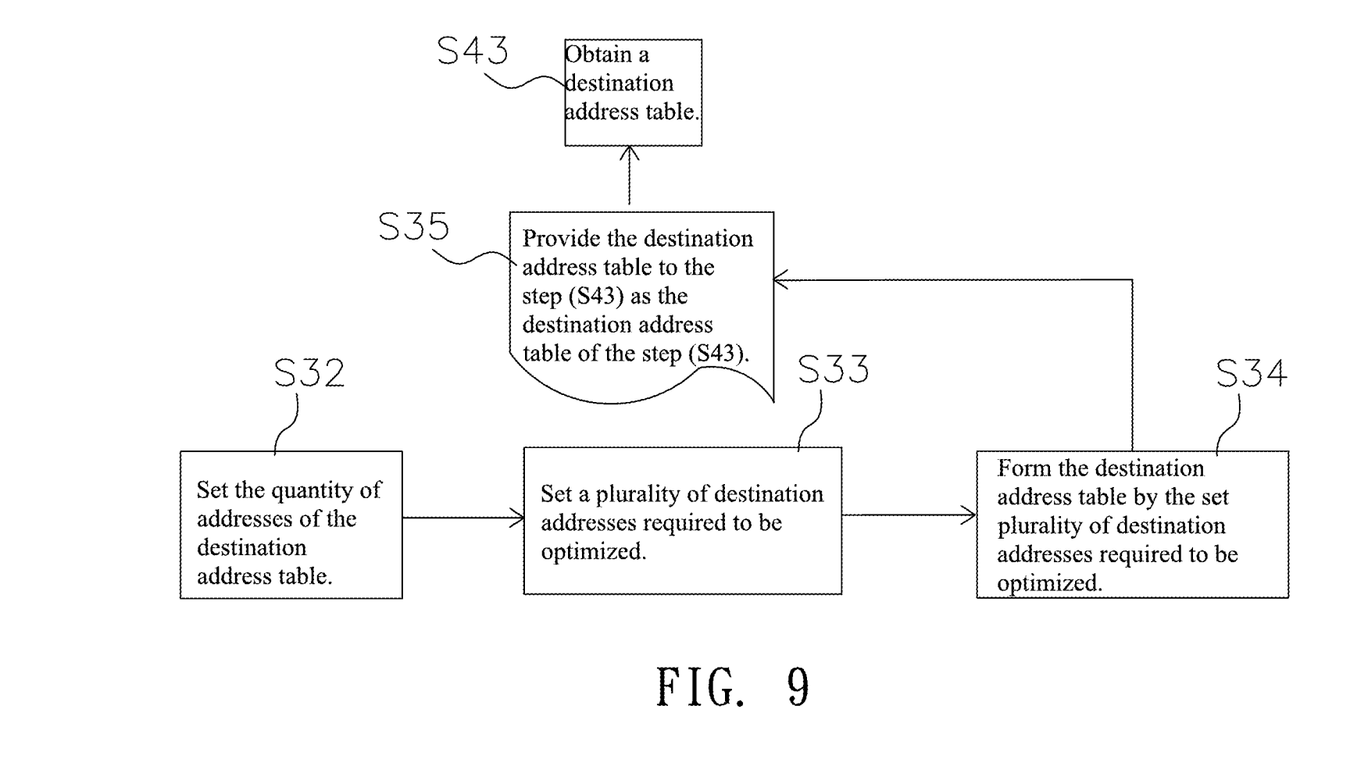
FIG. 9 is a flow chart of a fixed program of obtaining a destination address table in accordance with the second embodiment of the present invention.

With reference to FIG. 9 for a flow chart of a fixed program of obtaining a destination address table in accordance with the second embodiment of the present invention, a destination address table as described in the Step (S43) is obtained by a fixed program, and the fixed program comprises the steps of: Step (S32): setting the quantity of addresses of the destination address table, and then carrying out Step (S33); Step (S33): setting a plurality of destination addresses required to be optimized, and then carrying out Step (S34); Step (S34): forming the destination address table by the set plurality of destination addresses required to be optimized, and then carrying out Step (S35); and Step (S35): providing the destination address table to the Step (S43) as the destination address table of the Step (S43).

The foregoing fixed update of signature pre-computation table refers that the pre-calculated destination addresses are pre-calculated before the virtual switch is started, and cannot be changed after the virtual switch is started. This method just needs to set the signature pre-computation table once, so as to reduce the time for setting some time for setting signature pre-computation table to achieve a better performance and improves the throughput of the virtual switch much better than the conventional methods, but its flexibility is slightly lower than the method of dynamically setting the signature pre-computation table in accordance with the first preferred embodiment.

In the Step (S33), the plurality of destination addresses requiring an optimization is set, and it refers that the destination addresses statistically having a frequency of inputting packets greater than a predetermined frequency value. Therefore, the characteristic value of the packets are computed before these packets are selected, and their destination addresses and characteristic values are stored into the signature pre-computation table, so as to reduce the time for processing these packets and optimize the destination address of the packet.

Figure 10:
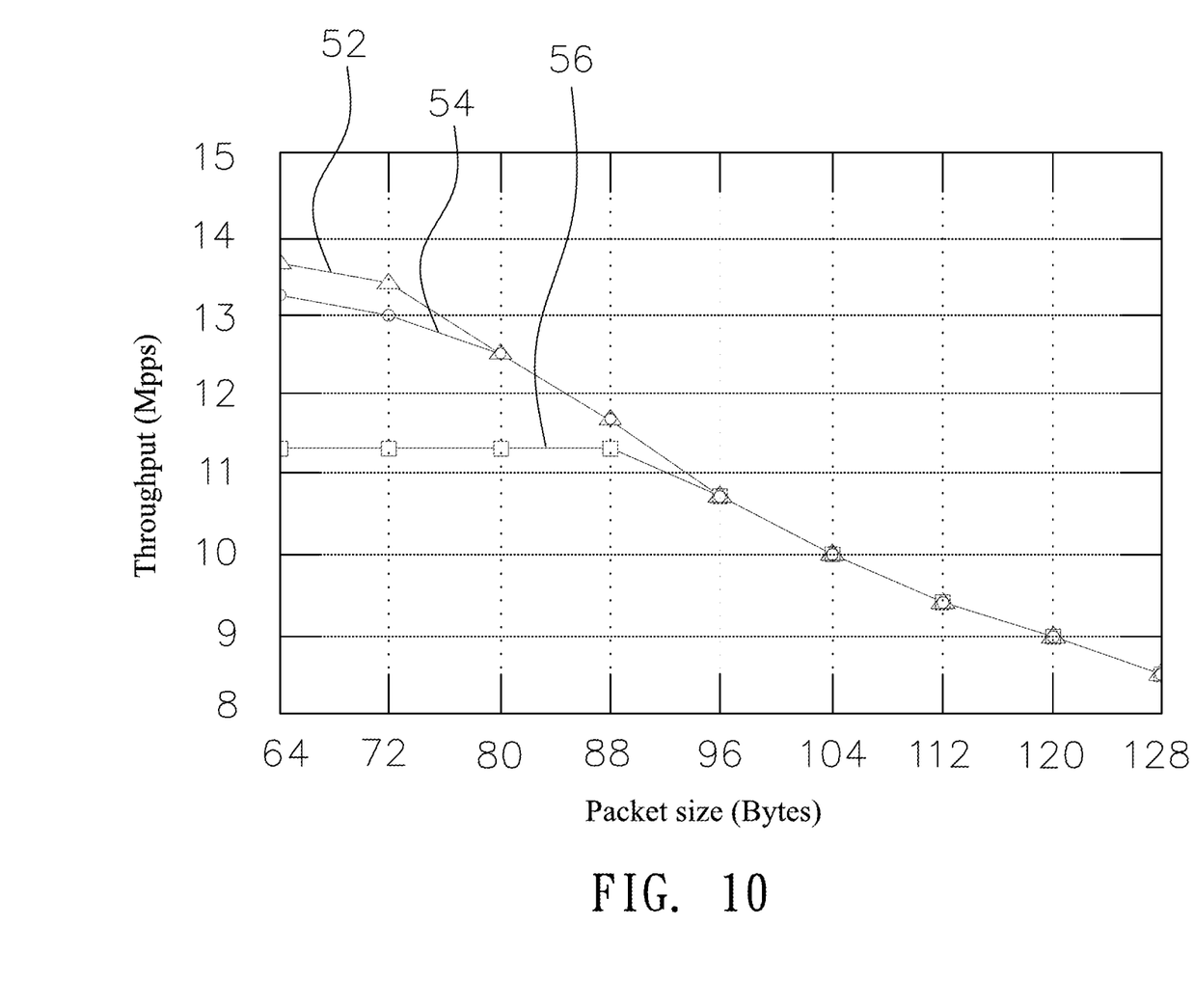
FIG. 10 is a statistical chart comparing the throughputs of the packet processing methods in accordance with the first and second embodiment of the present invention and the conventional packet processing method.

With reference to FIG. 10 for a statistical chart comparing the throughputs of the packet processing methods according to the present invention with the conventional packet processing method, the virtual switch throughput 52 used for the program of fixedly updating the signature pre-computation table is represented by a triangle, and the virtual switch throughput 54 used for the program of dynamically updating the signature pre-computation table is represented by a circle, and the virtual switch throughput 56 used for the conventional processing method is represented by a square. When the packet size is less than 96 bytes, both of the virtual switch throughput 52 used for the program of fixedly updating the signature pre-computation table and the virtual switch throughput 54 used for the program of dynamically updating the signature pre-computation table are much greater than the virtual switch throughput 56 of the conventional programs. Compared with the conventional methods, the first and second preferred embodiment of the present invention improves the throughput by approximately 19%~20%. Obviously, the present invention achieves the effect of saving the time required for processing a packet and improves the throughput of the virtual switch.

While the invention has been described by means of specific embodiments, numerous modifications and variations could be made thereto by those skilled in the art without departing from the scope and spirit of the invention set forth in the claims.

What is claimed is:

1. A packet processing method for a virtual switch, carried out in the virtual switch of a software defined network (SDN) architecture, and having a flow table, and the flow table including a plurality of flow entries, each having a corresponding action, and the method setting a signature pre-computation table in advance, and the signature pre-computation table including a plurality of destination addresses and a plurality of signatures corresponding to the destination addresses respectively, and the signatures of the signature pre-computation table being computed by a signature function in advance and stored into the signature pre-computation table; and the method comprising the steps of:

Step (S1): inputting a packet, and then carrying out Step (S2);

Step (S2): resolving a destination address of the packet, and then carrying out Step (S3);

Step (S3): comparing the destination address with the signature pre-computation table, and determining whether the destination address falls in the signature pre-computation table, if yes, then carrying out Step (S4); or else carrying out Step (S5);

Step (S4): obtaining a signature according to the destination address of the packet, and then carrying out Step (S7);

Step (S5): resolving the structure of the packet, and then carrying out Step (S6);

Step (S6): computing the signature of the packet according to the structure of the packet, and then carrying out Step (S7);

Step (S7): comparing the signature of the packet with a plurality of flow entries of the flow table, and determining whether the signature falls within the flow entries, if yes, carrying out Step (S8); if no, carrying out Step (S9);

Step (S8): performing an action corresponding to the flow entry where the signature is situated, and then carrying out Step (S10);

Step (S9): discarding the packet; and

Step (S10): outputting the packet;

wherein, the packet processing method for a virtual switch is capable of making use of the installation of a signature pre-computation table to set the destination address falling within the packets in the signature pre-computation table without the need of computing the signature of the packet, and obtain a corresponding signature according to the destination address of the packet, so as to reduce the required time of processing a packet effectively and improve the throughput of the virtual switch; and further comprising a program of dynamically updating the signature pre-computation table taken place between the Step (S1) and Step (S2), and the program of dynamically updating the signature pre-computation table presetting a predetermined quantity as a threshold, and the threshold having a unit, and the program of dynamically updating the signature pre-computation table having a cumulative counter for computing a cumulative quantity of the threshold unit, and the program of dynamically updating the signature pre-computation table comprising the steps of:

Step (S12): updating the cumulative quantity by the cumulative counter, and determining whether the cumulative quantity has reached the threshold, if yes, carrying out Step (S13); if no, carrying out Step (S2);

Step (S13): obtaining a destination address table, and then carrying out Step (S14);

Step (S14): retrieving a key value structure with a destination address (ip_dst) from the packet structure of the packet, filling a destination address (Dst_ip) of the destination address table into the destination address (ip_dst) of the key value structure required for computing the destination address table, and then carrying out Step (S15);

Step (S15): computing the signatures of all packets of the destination address table, and then carrying out Step (S16);

Step (S16): storing the signatures and destination addresses of all packets of the destination address table into the signature pre-computation table, and then carrying out Step (S17); and Step (S17): resetting the cumulative quantity of the packet to zero, and then carrying out Step (S2).

2. The packet processing method for a virtual switch according to claim 1, wherein the threshold is in a unit of packet, system operation time in seconds or system idle time in seconds.

3. The packet processing method for a virtual switch according to claim 2, wherein when the threshold is in the unit of packet, the cumulative quantity counted by the cumulative counter is a packet cumulative quantity, and the cumulative counter updating the cumulative quantity refers to the cumulative counter incrementing the packet cumulative quantity by 1.

4. The packet processing method for a virtual switch according to claim 2, wherein when the threshold is in the unit of system operation time in seconds, the cumulative quantity counted by the cumulative counter is a cumulative system operation time in seconds, and the cumulative counter updating the cumulative quantity refers to the cumulative counter counting the cumulative quantity of the system operation time in seconds which is equal to a cumulative system operation time in seconds.

5. The packet processing method for a virtual switch according to claim 2, wherein when the threshold is in the unit of system idle time in seconds, the cumulative quantity counted by the cumulative counter is a cumulative system idle time in seconds, and the cumulative counter updating the cumulative quantity refers to the cumulative counter counting the cumulative quantity of the system idle time in seconds which is equal to a cumulative system idle time in seconds.

6. The packet processing method for a virtual switch according to claim 1, wherein the destination address table in Step (S13) is obtained by a dynamic program, and the dynamic program comprises the steps of:
   Step (S22): setting the quantity of addresses of the destination address table, and then carrying out Step (S23);
   Step (S23): selecting flow entries including the destination address from the flow table, and then carrying out Step (S24);
   Step (S24): sorting the flow entries in a descending order according to the number of using the packet, and then carrying out Step (S25);
   Step (S25): capturing the destination addresses of the flow entries to form the destination address table, and the destination address of any flow entry exceeding the quantity of addresses will not be captured, and then carrying out Step (S26); and
   Step (S26): providing the destination address table to Step (S13) as the destination address table of the Step (S13), and then returning to Step (S23).

7. A packet processing method for a virtual switch, carried out in the virtual switch of a software defined network (SDN) architecture, and having a flow table, and the flow table including a plurality of flow entries, each having a corresponding action, and the method setting a signature pre-computation table in advance, and the signature pre-computation table including a plurality of destination addresses and a plurality of signatures corresponding to the destination addresses respectively, and the signatures of the signature pre-computation table being computed by a signature function in advance and stored into the signature pre-computation table; and the method comprising the steps of:
   Step (S1): inputting a packet, and then carrying out Step (S2);
   Step (S2): resolving a destination address of the packet, and then carrying out Step (S3);
   Step (S3): comparing the destination address with the signature pre-computation table, and determining whether the destination address falls in the signature pre-computation table, if yes, then carrying out Step (S4); or else carrying out Step (S5);
   Step (S4): obtaining a signature according to the destination address of the packet, and then carrying out Step (S7);
   Step (S5): resolving the structure of the packet, and then carrying out Step (S6);
   Step (S6): computing the signature of the packet according to the structure of the packet, and then carrying out Step (S7);
   Step (S7): comparing the signature of the packet with a plurality of flow entries of the flow table, and determining whether the signature falls within the flow entries, if yes, carrying out Step (S8); if no, carrying out Step (S9);
   Step (S8): performing an action corresponding to the flow entry where the signature is situated, and then carrying out Step (S10);
   Step (S9): discarding the packet; and
   Step (S10): outputting the packet;
   wherein, the packet processing method for a virtual switch is capable of making use of the installation of a signature pre-computation table to set the destination address falling within the packets in the signature pre-computation table without the need of computing the signature of the packet, and obtain a corresponding signature according to the destination address of the packet, so as to reduce the required time of processing a packet effectively and improve the throughput of the virtual switch; and
   further comprising a program of fixedly setting a signature pre-computation table taken place between the Step (S1) and Step (S2), and the program of fixedly setting a signature pre-computation comprising the steps of:
   Step (S43): obtaining a destination address table, and then carrying out Step (S44);
   Step (S44): retrieving a key value structure from the packet structure of the packet, and the key value structure having a destination address (ip_dst), and filling a destination address (Dst_ip) of the destination address table into a destination address (ip_dst) to compute the key value structure required by the signature, and then carrying out Step (S45);
   Step (S45): computing the signatures of all packets of the destination address table, and then carrying out Step (S46); and
   Step (S46): storing the signatures and destination addresses of all packets of the destination address table into the signature pre-computation table, and then carrying out Step (S2).

8. The packet processing method for a virtual switch according to claim 7, wherein the destination address table in the Step (S43) is obtained by a fixed program, and the fixed program comprises the steps of:
   Step (S32): setting the quantity of addresses of the destination address table, and then carrying out Step (S33);
   Step (S33): setting a plurality of destination addresses required to be optimized, and then carrying out Step (S34);
   Step (S34): forming the destination address table by the set plurality of destination addresses required to be optimized, and then carrying out Step (S35); and
   Step (S35): providing the destination address table to the Step (S43) as the destination address table of the Step (S43).

9. The packet processing method for a virtual switch according to claim 8, wherein the set plurality of destination addresses required to be optimized of the Step (S33) refers to the plurality of destination addresses statistically having a frequency of inputting packets greater than a predetermined frequency value.

\* \* \* \* \*